Patented Jan. 24, 1950

2,495,244

UNITED STATES PATENT OFFICE 2,495,244

ESTER-LIKE DERIVATIVES OF AZO DYESTUFFS

Friedrich Felix and Alphonse Heckendorn, Basel, Ernst Reich, Neue Welt, and Fritz Oesterlein, Basel, Switzerland, assignors to Ciba Limited, Basel, Switzerland, a Swiss firm No Drawing. Application September 20, 1945, Serial No. 617,699. In Switzerland October 6, 1944

2 Claims. (Cl. 260—202)

U. S. Patents Nos. 2,170,262, 2,120,741, 2,199,048 and 2,276,187 describe the preparation of ester-like dyestuff derivatives by treating dyestuffs containing hydroxyl groups with organic acylating agents which contain, in addition to the acylating group, at least one substituent which, if necessary after suitable conversion, imparts solubility to the acylation products. These esterification products have hitherto been used principally for dyeing cellulosic materials (cf. U. S. Patent No. 2,095,600).

Application Serial No. 617,607, filed on even date herewith, demonstrates that esters obtained according to the process of U. S. Patents Nos. 2,170,262, 2,120,741, 2,199,048 and 2,276,187, can surprisingly be used with good results for chroming animal fibers if the dyeing is conducted in the presence of ammonium sulfate and an alkali chromate.

The object of the present invention is to produce new esters which are especially suitable for dyeing animal fibers by the process of application Serial No. 617,697. These esters are derived principally from ortho : ortho'-dihydroxyazo dyestuffs obtained from aromatic ortho-hydroxylated diazo compounds and aromatic or heterocyclic hydroxyl compounds which couple in ortho-position with respect to the hydroxyl group, the two components being so selected that the resulting ortho : ortho'-dihydroxyazo-dyestuff, if it contains no nitro groups, will contain at least two substituents which do not impart solubility. In the latter case the resultant dyestuffs are subsequently nitrated. Thus, the dyestuffs are produced by an appropriate combination of diazo compounds, which are made, for example, from the ortho-aminophenols or ortho-aminonaphthols or analoques thereof hereinafter mentioned, with coupling components of the type of the hydroxy compounds also mentioned hereinafter.

There may be used as ortho-aminophenols, among others: 1-hydroxy-2-aminobenzene, 1-hydroxy-2-amino-4-chlorobenzene, 1-hydroxy-2-amino-4:6-dichlorobenzene, 1-hydroxy-2-amino-3:4:6-trichlorobenzene, 1-hydroxy-2-amino-3:4:5:6-tetrachlorobenzene, 1-hydroxy-2-amino-4-benzotrifluoride, 1-hydroxy-2-amino-4-methoxybenzene, 1-hydroxy-2-aminonaphthalene, 2-hydroxy-1-aminonaphthalene, 1-hydroxy-8-aminonaphthalene, 4'-chloro-4-amino-2-methyl-5-hydroxy-1:1'-azobenzene, etc. As coupling components there may be used, among others the following hydroxyl compounds: 1-hydroxynaphthalene, 2-hydroxynaphthalene, 1-hydroxy-4-chloronaphthalene, 1-hydroxy-5:8-dichloronaphthalene, 1-hydroxy-5-chloronaphthalene, 2-hydroxy-6-methoxynaphthalene, 2-hydroxy-7-methoxynaphthalene, 2-hydroxy-4:6-dichloronaphthalene, 2-hydroxy-4:6-dibromonaphthalene, 1-hydroxy-4-methoxynaphthalene, 1-hydroxynaphthalene-4-methylketone, 1-hydroxynaphthalene-4-phenylketone, 1-hydroxy-4-ethylnaphthalene; also arylides of 2:3-hydroxynaphthoic acid, such as the condensation products of this acid with amino compounds, such as 1-aminobenzene, 1-amino-2-methoxybenzene, 4-amino-1:1'-azobenzene; etc., also compounds of the benzene series, such as 1-hydroxy-4-methylbenzene, 1-hydroxy-2-allyl-4-methylbenzene, 1-hydroxy-2-n-propyl-4-methylbenzene, 1-hydroxy-2-isopropyl-4-methylbenzene, 1-hydroxy-2-benzyl-4-methylbenzene, 1-hydroxy-2-methyl-4-ethylbenzene, 1-hydroxy-2-ethyl-4-methylbenzene, 1-hydroxy-2-methyl-4-isopropylbenzene, 1-hydroxy-2-methyl-4-cyclohexylbenzene, 1-hydroxy-2-methyl-4-benzylbenzene, 1-hydroxy-2-benzyl-4-n-propylbenzene, etc.

Hydroxyl compounds are also to be understood to mean compounds containing enolizable keto groups, such as, for instance, 3-methyl-5-pyrazolone, 1-phenyl-3-methyl-5-pyrazolone, 1-(2':5'-dichloro)-phenyl-3-methyl-5-pyrazolone, 1-(3'-chloro)-phenyl-3-methyl-5-pyrazolone, 1-(3'nitro)-phenyl-3-methyl-5-pyrazolone, 2:4-dihydroxyquinoline, the anilide of acetoacetic acid, the ortho-anisidide of acetoacetic acid, the 2:4-dichloroanilide of acetoacetic acid, etc. The azo-dyestuffs resulting from these components under the conditions indicated are thus esterified with the esterifying agents of Patents Nos. 2,170,262, 2,120,741, 2,199,048 and 2,276,187 such as, for example benzoylchloride sulfonic acid, benzoic acid-3-sulfochloride, dichloride of meta-sulfobenzoic acid, benzoic acid-3:5-disulfo-chloride, sulfosalicylic acid dichloride, sulfo-acetic acid chloride, 4-chloromethylbenzoylchloride, etc., advantageously in the presence of a tertiary base, such as pyridine or thiazole.

The new dyestuffs thus correspond to the general formula

in which the symbol $y$—O— is in ortho-position to the azo group and the symbol —O—$z$ in an adjacent position to the azo group,

stands for the radical of an azo compound in which $R_1$ represents an aromatic radical selected from the aromatic radicals of the benzene and of the naphthalene series, and $R_2$ stands for the radical of a coupling component, $R_1$ and $R_2$ being free from substituents which impart water-solubility but containing at least two other substituents, $y$ standing for an acyl radical containing at least one salt-forming group selected from the group consisting of the radical of a quaternary ammonium group and of a sulfonic group, and $z$ for a member of the group consisting of hydrogen and an acyl radical containing at least one salt-forming group selected from the group consisting of the radical of a quaternary ammonium group and of a sulfonic group.

The esterification products may be worked up in such a manner that after the reaction is completed, the tertiary base is distilled off under reduced pressure and the residue is transferred into a salt solution, whereby the esterification products are separated.

The latter may also be obtained in the form of more difficultly soluble double salts, for instance zinc double salts, if a suitable metal chloride, such as, for instance, zinc chloride or inorganic or organic acids are added, to the original reaction mixture.

The following examples illustrate the invention, but are not to be regarded as limiting it in any way, the parts being by weight:

Example 1

36 parts of the azo-dyestuff obtained from diazotized 1-hydroxy-2-amino-4-chlorobenzene and 1-hydroxy-5:8-dichloronaphthalene are esterified as follows: 44–60 parts of benzoic acid-3-sulfochloride are first dissolved in about 180 parts of pyridine at 50–60° C. Then, at about 40° C., the 36 parts of the aforesaid azo-dyestuff are added while thoroughly stirring. After the stirring operation has continued at approximately 50° C. for several hours, the pyridine is distilled off under reduced pressure, the mass is introduced into about 500 parts of a sodium chloride solution of 10 per cent. strength and the whole is stirred until the dyestuff is homogeneously dispersed in the solution. The dyestuff is then filtered off, washed with sodium chloride solution and dried in a vacuum. It is a yellow-brown powder which easily dissolves in water and which by the single bath process in the presence of agents yielding chromium, dyes wool reddish blue tints. In its free form the dyestuff probably corresponds to the formula

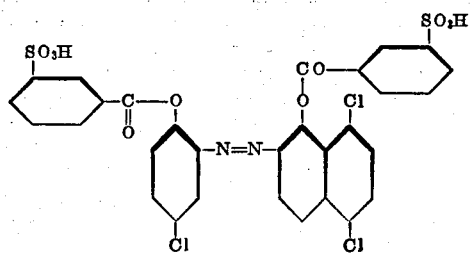

Example 2

44–60 parts of benzoic acid-3-sulfochloride are dissolved in 150–180 parts of pyridine at 60° C. At a temperature of about 40–50° C. 40 parts of the azo dyestuff obtained from diazotized 1-hydroxy-2- amino-4:6-dichlorobenzene and 1-hydroxy-5:8-dichloronaphthalene are introduced and the whole is stirred, if necessary at raised temperature, until a test portion of the pyridine solution of the reaction product is soluble in water to give a clear solution. By distilling off the pyridine and introduction of the residue into sodium chloride solution, stirring, filtering and drying, a yellow-brown powder is obtained which easily dissolves in water and which, by the single bath process in the presence of agents yielding chromium, dyes wool pure blue tints. In its free form the dyestuff probably corresponds to the formula

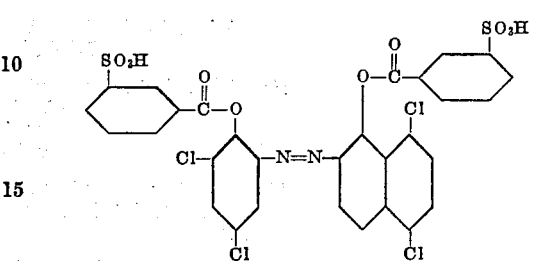

The following procedure may alternatively be applied: 60 parts of benzoic acid-3-sulfochloride and 40 parts of the azo-dyestuff are stirred for 3 hours at a temperature of 40–45° C. in 200 parts of pyridine, the pyridine is distilled off under reduced pressure, the remainder is introduced into 1000 parts of water and the ester is filtered. This is then stirred in 1000 parts of a sodium chloride solution of 5 per cent. strength, filtered and dried.

When using, instead of the 44–60 parts of benzoic acid-3-sulfochloride, the corresponding quantity of benzoic acid-3:5-disulfochloride, there is obtained a dyestuff of the formula

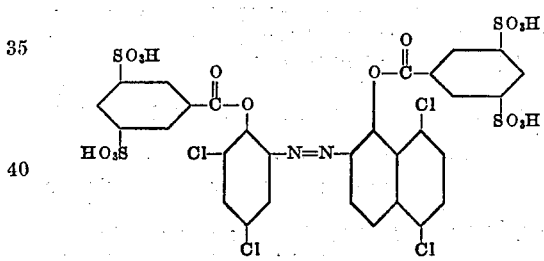

whereas products of the formula

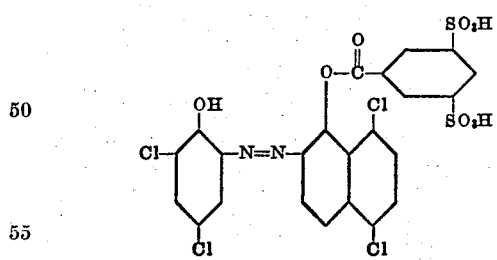

or

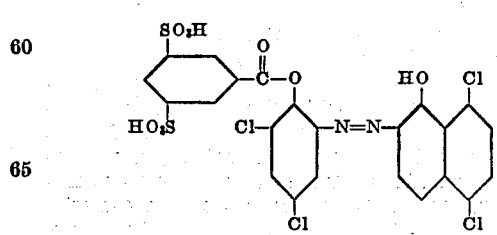

are obtained when using smaller quantities of this esterifying agent.

The similarly prepared ester of the dyestuff obtained from diazotized 1-hydroxy-2-amino-3:4:6-trichlorobenzene and 1-hydroxy-5:8-dichloronaphthalene is suitable also for dyeing according to the after-chroming process.

Example 3

58 parts of benzoic acid-3-sulfochloride are dissolved in 150 parts of pyridine and 32.85 parts of the azo-dyestuff obtained from diazotized 1-hydroxy-2-amino-4-chlorobenzene and 1-hydroxy-4-methoxynaphthalene are introduced at 40–50° C. while thoroughly stirring. This mixture is stirred for 2–3 hours, after which time the pyridine is distilled off in a vacuum and the residue is introduced into 500 parts of a sodium chloride solution of 10 per cent. strength. The precipitated dyestuff is filtered off, washed with sodium chloride solution and dried. It is a dark powder which dissolves in water and the solution of which dyes wool according to the single bath process in the presence of agents yielding chromium blue tints. In its free form the dyestuff probably corresponds to the formula

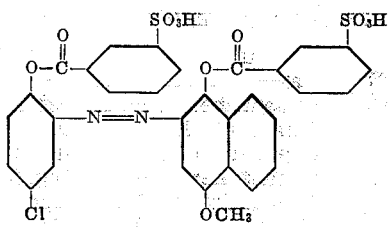

Example 4

45.5 parts of the dyestuff obtained from diazotized 1-hydroxy-2-amino-4-chlorobenzene and 2-hydroxy-4:6-dibromo-naphthalene are dissolved in 160 parts of pyridine and 58 parts of benzoic acid-3-sulfochloride are added while thoroughly stirring. This mixture is stirred at about 50° C. until a test portion is easily soluble in water. After the dyestuff has been worked up in accordance with the procedure described in Example 3, a dark powder is obtained which is easily soluble in water and dyes wool according to the single bath process from an aqueous solution in the presence of agents yielding chromium fast reddish-blue tints. In its free form the dyestuff probably corresponds to the formula

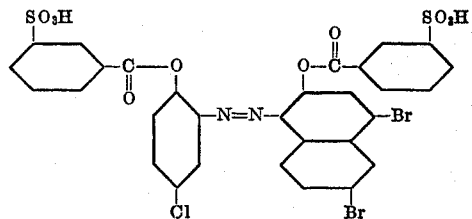

By applying a similar procedure to the dyestuffs obtained from diazotized 1-hydroxy-2-aminobenzene and 2-hydroxy-4:6-dibromonaphthalene, a product showing similar behavoir is obtained.

Example 5

35.0 parts of the dyestuff obtained from diazotized 1-hydroxy-2-amino-4:6-dichlorobenzene and 2:4-dihydroxyquinoline are treated in 150 parts of pyridine with 38 parts of benzoic acid-3:5-disulfochloride until a test portion of this mixture is easily soluble in water. The dyestuff is isolated by distilling off the pyridine under reduced pressure, introduction of the mass into sodium chloride solution, filtering and drying. It dyes wool from an aqueous solution in the presence of an agent yielding chromium bordeaux-red tints. In its free form the dyestuff probably corresponds to the formula

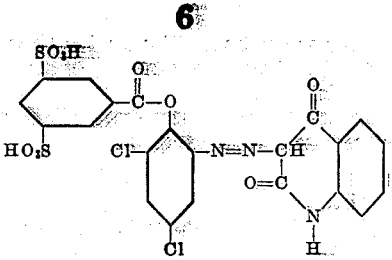

A similar procedure is followed in esterifying the dyestuff obtained from diazotized 1-hydroxy-2-amino-4-chlorobenzene and 1-(2'-chloro)-phenyl-3-methyl-5-pyrazolone, whereby a dyestuff is obtained which dyes wool according to the same process red tints.

Azo-dyestuffs of the formulas

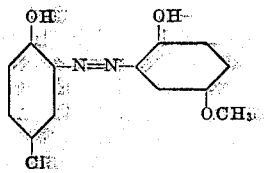

and

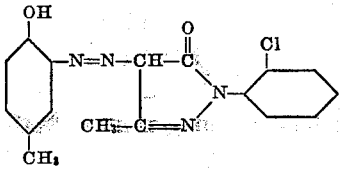

may also be treated with acylating agents, whereby compounds of the formulas

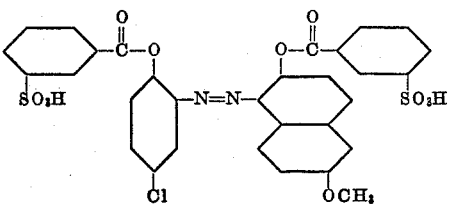

and

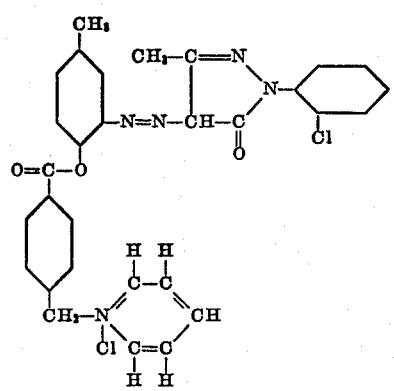

respectively, are obtained.

Example 6

100 parts of well wetted wool are introduced at 60° C. into a dyebath containing in 4000 parts of water 2 parts of the dyestuff obtainable according to the first paragraph of Example 2, 2.5 parts of ammonium sulfate, 2.5 parts of sodium chromate and 10 parts of Glauber salt. In the course of 30 minutes, the temperature is raised to the boil and the wool is dyed at the boil for ¾ hour. After the addition of 0.5–1 per cent. of acetic acid of 40 per cent. strength dyeing is continued for another hour at the boil. The wool is then rinsed and dried. It is dyed a fast pure blue tint.

What we claim is:

1. An ester-like monoazo dyestuff derivative which corresponds to the formula

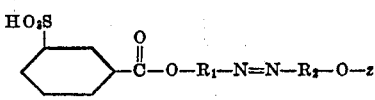

in which the radical

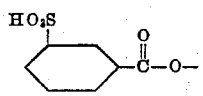

is in the ortho-position to the azo group and the symbol —O—Z in a position adjacent to the azo group, —$R_1$—N=N—$R_2$— stands for the radical of an azo compound in which $R_1$ represents an aromatic radical of the benzene series and $R_2$ stands for an aromatic radical of the naphthalene series, $R_1$ and $R_2$ being free from substituents which impart water-solubility but containing together at least two halogen atoms as substituents, z standing for a member of the group consisting of hydrogen and the radical

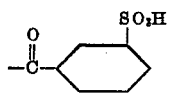

2. The ester-like azo-dyestuff derivative of the formula

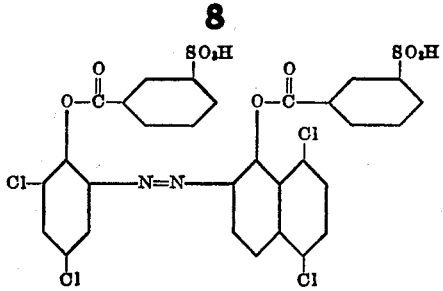

FRIEDRICH FELIX.
ALPHONSE HECKENDORN.
ERNST REICH.
FRITZ OESTERLEIN.

REFERENCES CITED

The following references are of record in the file of this patent:

UNITED STATES PATENTS

| Number | Name | Date |
|---|---|---|
| 2,095,077 | Payne | Oct. 5, 1937 |
| 2,095,600 | Graenacher et al. | Oct. 12, 1937 |
| 2,109,806 | Straub et al. | Mar. 1, 1938 |
| 2,120,741 | Graenacher et al. | June 14, 1938 |
| 2,170,262 | Graenacher et al. | Aug. 22, 1939 |
| 2,199,048 | Graenacher et al. | Apr. 30, 1940 |
| 2,237,483 | Graenacher et al. | Apr. 8, 1941 |
| 2,249,956 | Heyna | July 22, 1941 |
| 2,274,544 | Gubelmann | Feb. 24, 1942 |
| 2,276,187 | Graenacher et al. | Mar. 10, 1942 |
| 2,359,862 | Linch | Oct. 10, 1944 |

Certificate of Correction

Patent No. 2,495,244 January 24, 1950

FRIEDRICH FELIX ET AL.

It is hereby certified that errors appear in the printed specification of the above numbered patent requiring correction as follows:

Column 1, line 12, for the serial number "617,607" read *617,697*; line 38, for "analoques" read *analogues*; column 2, line 29, for "(3'nitro)" read *(3'-nitro)*; column 7, line 17, for "–0–Z" read *–0–z*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*